United States Patent
Ganesan (10) Patent No.: US 8,788,706 B2
(45) Date of Patent: Jul. 22, 2014

(54) METHOD AND SYSTEM FOR MANAGING DATA TRANSMISSION BETWEEN DEVICES BEHIND NETWORK ADDRESS TRANSLATORS (NATS)

(75) Inventor: Prasanna Ganesan, Menlo Park, CA (US)

(73) Assignee: Vudu, Inc., Santa Clara, CA (US)

( * ) Notice: Subject to any disclaimer, the term of this patent is extended or adjusted under 35 U.S.C. 154(b) by 1511 days.

(21) Appl. No.: 11/364,641

(22) Filed: Feb. 27, 2006

(65) Prior Publication Data
US 2009/0024762 A1    Jan. 22, 2009

(51) Int. Cl.
*G06F 15/16* (2006.01)
*H04L 29/06* (2006.01)
*H04L 29/12* (2006.01)

(52) U.S. Cl.
CPC ...... *H04L 65/4084* (2013.01); *H04L 29/12169* (2013.01); *H04L 61/1576* (2013.01)
USPC ........................................................ 709/245

(58) Field of Classification Search
USPC ........................................................ 709/245
See application file for complete search history.

(56) References Cited

U.S. PATENT DOCUMENTS

| | | | |
|---|---|---|---|
| 6,178,183 B1 * | 1/2001 | Buskirk, Jr. | 370/493 |
| 7,133,368 B2 | 11/2006 | Zhang et al. | |
| 7,254,608 B2 * | 8/2007 | Yeager et al. | 709/203 |
| 7,284,051 B1 * | 10/2007 | Okano et al. | 709/226 |
| 7,328,280 B2 * | 2/2008 | Takeda et al. | 709/245 |
| 7,788,383 B2 * | 8/2010 | Andreasen | 709/227 |
| 2002/0042875 A1 * | 4/2002 | Shukla | 713/151 |
| 2002/0059425 A1 * | 5/2002 | Belfiore et al. | 709/226 |
| 2002/0075714 A1 * | 6/2002 | Pereira et al. | 365/49 |
| 2002/0108121 A1 * | 8/2002 | Alao et al. | 725/110 |
| 2002/0116533 A1 * | 8/2002 | Holliman et al. | 709/246 |
| 2002/0169885 A1 * | 11/2002 | Alao et al. | 709/230 |
| 2002/0178261 A1 * | 11/2002 | Chang et al. | 709/225 |
| 2003/0046260 A1 * | 3/2003 | Satyanarayanan et al. | 707/1 |
| 2003/0152034 A1 * | 8/2003 | Zhang et al. | 370/252 |
| 2003/0182291 A1 * | 9/2003 | Kurupati et al. | 707/100 |
| 2003/0233475 A1 * | 12/2003 | Maufer et al. | 709/245 |
| 2003/0233568 A1 * | 12/2003 | Maufer et al. | 713/200 |

(Continued)

OTHER PUBLICATIONS

D'Acunto, "A Measurement of NAT and Firewall Characteristics in Peer-to-Peer Systems," 2009, ASCI Conference, 1-5.*

(Continued)

*Primary Examiner* — Azizul Choudhury
*Assistant Examiner* — Tariq Najee-Ullah
(74) *Attorney, Agent, or Firm* — David R. Stevens; Stevens Law Group (57) ABSTRACT

Techniques for managing direct communication between two devices are disclosed. Each of the device is behind a network address translator. According to one embodiment, a server, in responding to a request from a requesting device for needed data, is configured to determine some of devices in service to be candidates from a database, where the database has many entries, each of the entries pertaining to one of the devices. The candidates are determined in accordance with at least compatibility of respective network address translators with a network address translator of the requesting device. Among the candidates, the server then designates a finalist that is preferably not designated to be a supplying device more often than it should be on average. The server then notifies either the requesting device or the supplying device so that the requesting device can get the needed data directly from the supplying device.

23 Claims, 6 Drawing Sheets

(56) References Cited

U.S. PATENT DOCUMENTS

| | | |
|---|---|---|
| 2003/0233576 A1* | 12/2003 | Maufer et al. ............... 713/201 |
| 2003/0236828 A1 | 12/2003 | Rock et al. |
| 2004/0093434 A1* | 5/2004 | Hovell et al. ............... 709/249 |
| 2004/0133640 A1* | 7/2004 | Yeager et al. ............... 709/204 |
| 2004/0139228 A1* | 7/2004 | Takeda et al. ............... 709/245 |
| 2004/0172476 A1 | 9/2004 | Chapweske |
| 2004/0267875 A1* | 12/2004 | Hennessey et al. ............ 709/200 |
| 2005/0238034 A1* | 10/2005 | Gillespie et al. .............. 370/401 |
| 2006/0184688 A1 | 8/2006 | Ganguly et al. |
| 2006/0209853 A1 | 9/2006 | Hidaka et al. |
| 2007/0058670 A1 | 3/2007 | Kundura et al. |
| 2007/0174471 A1* | 7/2007 | Van Rossum ................ 709/229 |
| 2008/0192769 A1* | 8/2008 | Tischer et al. ............... 370/466 |
| 2008/0294785 A1* | 11/2008 | Ushiyama .................... 709/228 |
| 2009/0022166 A1 | 1/2009 | Ganesan |
| 2009/0043889 A1* | 2/2009 | Gobara et al. ............... 709/225 |
| 2009/0113067 A1* | 4/2009 | Andreasen .................... 709/231 |

OTHER PUBLICATIONS

U.S. Appl. No. 11/364,642, filed Feb. 27, 2006, Brittenson.

Non-Final Office Action dated Dec. 17, 2008 in U.S. Appl. No. 11/364,642, 18 pgs.

Non-Final Office Action date Mar. 18, 2010 in U.S. Appl. No. 11/626,352.

* cited by examiner

| 630 | 632 | 634 | 636 | 638 | 640 | 642 |
|---|---|---|---|---|---|---|
| Local machine | IP Address | Time-fill (1~5000) Program | title1 | title2 | ... | title 5000 |
| Box 1 | address 1 | Program1 | seg1 seg3 | seg4 | | seg4 |
| Box 2 | address 2 | Program2 | seg3 seg4 | seg1 | | |
| Box 3 | address 3 | Program3 | seg2 seg3 | seg4 | | |
| ... | | | | | | |
| Box N | address n | Program4 | seg1 seg3 | seg3 | | seg1 |

FIG. 6B

| 650 | Self | 606-n | 606-3 | 606-1 |
|---|---|---|---|---|
| seg1 | IPA1 | | | |
| seg2 | | IPA2 | | |
| seg3 | | | IPA3 | |
| seg4 | | | | IPA4 |

METHOD AND SYSTEM FOR MANAGING DATA TRANSMISSION BETWEEN DEVICES BEHIND NETWORK ADDRESS TRANSLATORS (NATS)

BACKGROUND

1. Technical Field

The present invention relates generally to the area of data transmission, and more particularly to techniques for managing data exchange between devices behind network address translators (NAT), where a network address translator may be employed in a device such as a router, a firewall or other security means.

2. Description of the Related Art

Network address translation is a way to rewrite the addresses of packets as they travel through a system. Typical uses include allowing several computers to share a single internet connection. Network address translation can also reinforce the security provided by a firewall, and in some cases provide equivalent levels of security. Typical devices that perform network address translation functions for the average computer user may be routers, cable/DSL modems or hardware firewalls that allow multiple computers to connect to it, or computers dedicated to the task of "masquerading" or "internet connection sharing" (ICS).

Network Address Translators (NATs), while providing many benefits, also come with many drawbacks. The most troublesome of those drawbacks is the fact that they break many existing IP applications, and make it difficult to deploy new ones. With the presence of network address translation, the communication between two devices behind respective NATs may be problematic because they do not permit external devices to initiate communication with a device behind a NAT without some explicit and complex configuration of the NAT. This may not be a major problem for a client-server system, since a client behind a NAT can initiate communication with the server (not behind a NAT) and then the two can talk to each other. However, problems arise in a peer-to-peer system where two different devices (nodes), each behind a NAT, need to communicate with each other. Essentially, neither one of two devices can initiate communication with the other because they are both behind NATs which are configured to block the traffic. Thus there is a need for a mechanism that can manage such communication between two devices, each behind a NAT.

As known to those skilled in the art, there are a number of variations and implementations of NATs. The common four treatments observed in implementations are: Full Cone, Restricted Cone, Port Restricted Cone, and Symmetric Cone.

Full Cone: A full cone NAT is one where all requests from the same internal IP address and port are mapped to the same external IP address and port. Furthermore, any external host can send a packet to the internal host, by sending a packet to the mapped external address.

Restricted Cone: A restricted cone NAT is one where all requests from the same internal IP address and port are mapped to the same external IP address and port. Unlike a full cone NAT, an external host (with IP address X) can send a packet to the internal host only if the internal host had previously sent a packet to IP address X.

Port Restricted Cone: A port restricted cone NAT is like a restricted cone NAT, but the restriction includes port numbers. Specifically, an external host can send a packet, with source IP address X and source port P, to the internal host only if the internal host had previously sent a packet to IP address X and port P.

Symmetric Cone: A symmetric NAT is one where all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a UDP packet back to the internal host.

It is also known that not all NATs are compatible with each other. In other words, a first device behind one type of NAT may not communicate with a second device behind another type of NAT or may communicate only with certain restrictions. Thus there is a need for a mechanism that manages various types of communication among devices, each may be behind a type of NAT.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for managing direct communication between two devices, each behind a network address translator. Depending on implementation, a network address translator may be included in a device or module, such as a router, a firewall or other security means. According to one aspect of the present invention, a server, in responding to a request from a requesting device for needed data, is configured to determine some of devices in service to be candidates from a database, where the database has many entries, each of the entries pertaining to one of the devices. The candidates are determined in accordance with at least compatibility of respective network address translators with a network address translator of the requesting device. Among the candidates, the server then designates a finalist that is most appropriate to supply the needed data according to certain criteria. Among the criteria that may include, but not be limited to, available bandwidth, physical location, ISP, compatibility of NAT or current status, one of the criteria is to make sure that the finalist is not designated to be a supplying device too much more often than it should be on average. The server then notifies either the requesting device or the supplying device so that the requesting device can get the needed data directly from the supplying device.

According to another aspect of the present invention, the request from the requesting device indicates that there are more than one devices needed to supply the needed data collectively at similar time. Thus the server is configured to designating another finalist that is most appropriate to supply the needed data according to certain criteria. One of the criteria is to make sure that the finalist is not designated to be a supplying device more often than it should be on average till there are a sufficient number of supplying devices. The server then notifies the requesting device which ones are to supply the needed data collectively or causes each of the supplying devices to start contacting the requesting device to initiate transmission of the needed data collectively.

According to still another aspect of the present invention, each of the supplying devices locally caches one or more segments of the needed data, where each of the segments is non-consecutive in a sense that data from all of the segments must be streamed in at similar time to be useful.

Depending on implementation, the present invention may be implemented in software, hardware, or a combination of both as a method, an apparatus or a system. According to one embodiment, the present invention is a method for managing peer-to-peer communication among a plurality of devices. The method comprises initiating a request to receive needed data from at least one supplying device, wherein the request causes a server to determine some of the devices to be candidates from a database with many entries, each of the entries pertaining to one of the devices. The some of the devices are determined in accordance with at least compatibility of respective network address translators with a network address translator of the requesting device. Among the candidates, the server is configured to designate a finalist that is not designated to be a supplying device more often than it should be on average. The requesting device is configured to receive from the server a message including necessary information to initiate a request to the supplying device to download the needed data; or caused to accept the needed data from the supplying device.

According to one embodiment, the present invention is a system for managing peer-to-peer communication among a plurality of devices. The system comprises a plurality of devices in service, and a server coupled to a database with many entries, each of the entries pertaining to one of the devices. Upon receiving a request from one of the devices (hereinafter "a requesting device"), the server is configured to determine some of the devices to be candidates from the database in accordance with at least compatibility of respective network address translators with a network address translator of the requesting device. Among the candidates, the server is configured to further designate a finalist that is not designated to be a supplying device more often than it should be on average. The requesting device then receives from the server a message including necessary information to initiate a request to the supplying device to download the needed data, or is caused to accept the needed data from the supplying device.

One of the objects of the present inventions is to provide techniques for managing data transmission between devices, each being behind a network address translator.

Other objects, features, advantages, benefits of the invention will become more apparent from the following detailed description of a preferred embodiment, which proceeds with reference to the accompanying drawings.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments, if any, do not inherently indicate any particular order nor imply limitations in the invention.

Embodiments of the invention are discussed herein with reference to FIGS. 1-6B. However, those skilled in the art will readily appreciate that the detailed description given herein with respect to these figures is for explanatory purposes as the invention extends beyond these limited embodiments Referring now to FIG. 1, there shows a configuration 100 in which the present invention may be practiced. The configuration 100 includes three representative devices A, B, and C, respectively referenced by 102, 104 and 106. Each of the devices 102, 104 and 106 may be a single standalone device or a collection of one or more computing devices. An example of a standalone device or computing device may include, but not be limited to, a desktop computer, a mobile device, a set-top box, and a media device. In one embodiment, it is assumed that device A is configured to receive data respectively from device B and device C with the assistance of a server 108.

Figure 1:
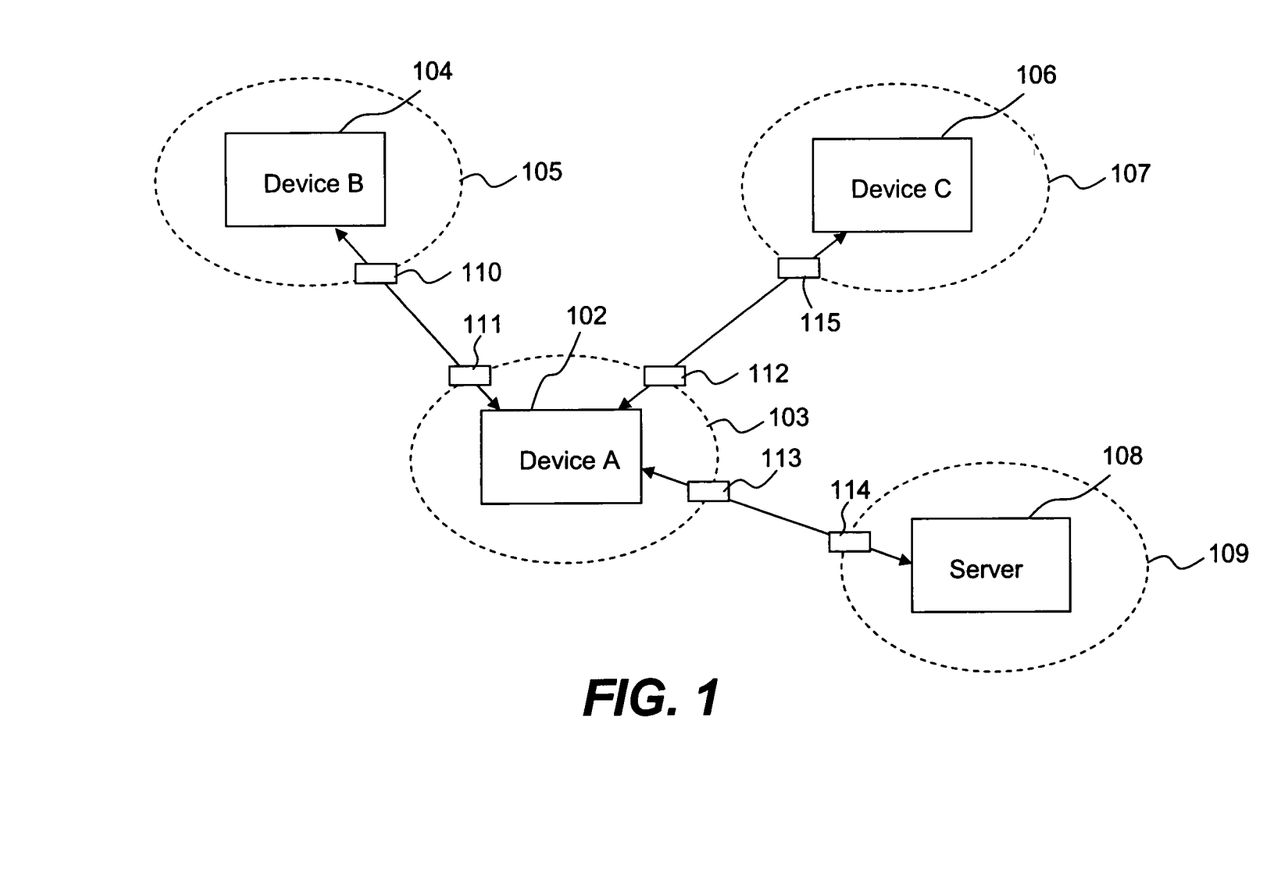
FIG. 1 shows an exemplary configuration system in which the present invention may be practiced, for simplicity, the configuration includes three representative device A, B, and C.

As shown in FIG. 1, each of the devices 102, 104 and 106 and the server 108 is coupled to a router or protected by a firewall or a security means 103, 105, 107 or 109. According to one embodiment of the present invention, each of the devices 102, 104 and 106 and the server 108 is configured to execute a protocol stack so that peer-to-peer communication between any two devices 102, 104 or 106 can be established. Along a communication path between any two of the devices, there are network address translators 110-115 of all types. For a list of currently available types and characteristics thereof, RFC 3049 entitled "Simple Traversal of User Datagram Protocol (UDP) Through Network Address Translators (NATs)" may be referenced and located at http://www.ieff.org/rfc/rfc3489.txt which is hereby incorporated by reference.

Figures 2, 3:
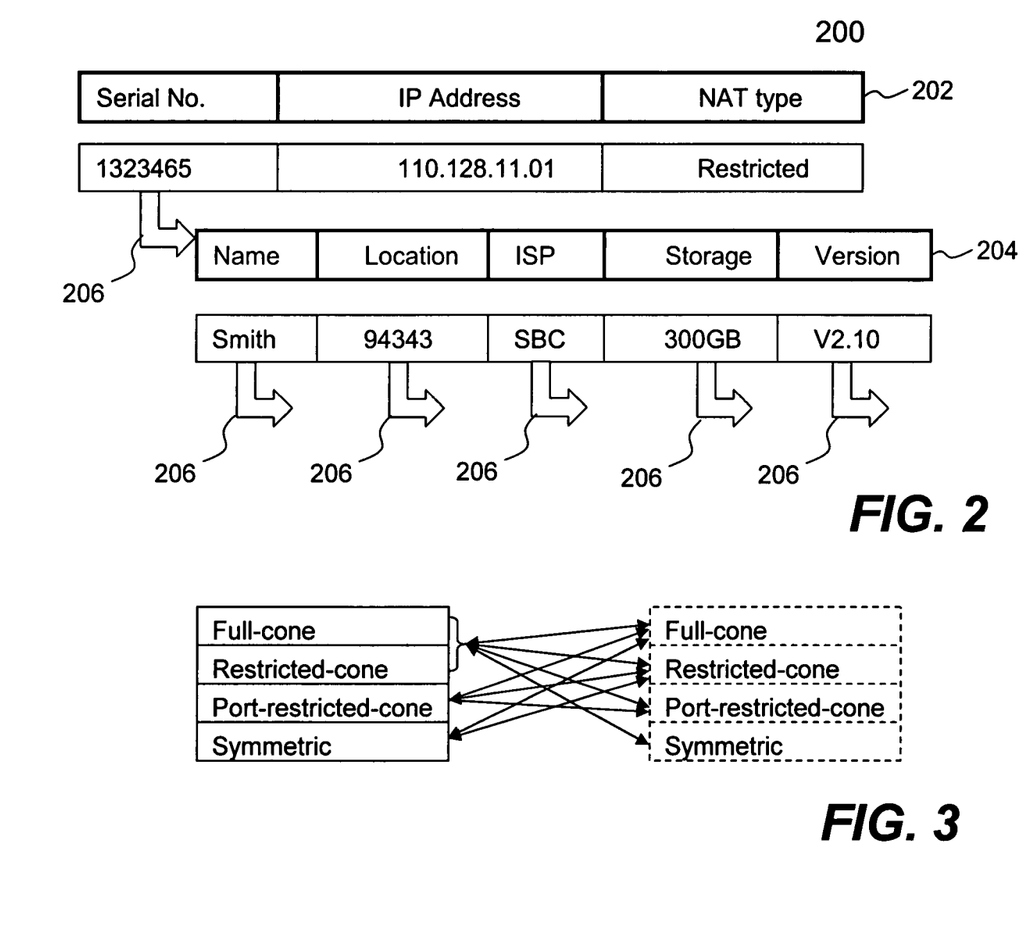
FIG. 2 shows an exemplary entry in a database to maintain status, characteristics or surrounding conditions of devices in service.
FIG. 3 shows a compatibility chart among four types of NAT.

In operation, the server 108 discovers what type of NAT each of registered devices (e.g., 102, 104 and 106) is behind, for example, by receiving a STUN probe request or a registration message therefrom. This discovery process may take place when a device is put into service for the first time or a device is returned to service after a period. Alternatively, the server 108 gets the characteristics and the surrounding conditions of a device by periodically exchanging messages. As a result, a database is created or updated about each of the devices. An exemplary entry 200 in the database is shown in FIG. 2. The exemplary entry 200 is for one device and may include information that may be stored in expandable layers. As depicted, a first layer 202 may include information that may be used to facilitate a designation of which device shall communicate with a device requesting to communicate with. A second layer 204 may include detailed information that may be used to facilitate a designation of which device shall communicate more effectively with a device requesting to communicate with. Depending on an actual deployment, each of the fields in the entry 200 may be updated electronically or manually, and respectively or collectively.

In one embodiment, "electronically updated" means that the server 108 is periodically in communication with devices in service and gets updated status of each of the devices. For example, a device may use a dynamic IP address that could be reassigned by a corresponding ISP (Internet Service Provider) at any time. By periodically contacting with the device, the server can keep the entry in the database updated. Likewise, "manually updated" means that some information needs updated manually. For example, a device previously-serviced by one ISP is now switched to another ISP, the change of the ISP is likely to be entered manually.

In one embodiment, "respectively updated" means that the fields in the entry 300 may be updated individually, which means that not all fields in an entry need to be updated as often as others, sometimes only one field needs to be updated. Likewise, "collectively updated" means that some information needs to be updated together. For example, the statuses of whether a device is busy or not and the corresponding available bandwidth may be collectively obtained.

In any case, the sign 206 means a corresponding field is not fully displayed or can be expanded when needed or depending on implementation. With the database, when one of the devices requests data substantially at the same time from more than one devices (e.g., two other devices), the requesting device sends a request to the server that looks up in the database and determine which two devices are the most appropriate ones to supply data to the requesting device. According to one aspect of the present invention, one of the criteria that the server relies upon to determine the candidates to supply the data is by a type of NAT the candidates are associated with.

For example, the requesting device is behind a symmetric NAT, the server is configured to designate devices that are behind a NAT that is compatible with a symmetric NAT. Given the above named four types, either a "Full-cone" NAT or a "Restricted-cone" NAT is a good candidate. Accordingly, among other criteria (e.g., a preferred ISP, a desired network speed and current status of a device), the server selects a device to be the supplier, where the selected device is behind a compatible NAT to that of the requesting device.

According to another embodiment, when a (sending) device is configured to send data to a (receiving) device, the sending device is provided with an instruction to send the data only to those devices that are behind a compatible NAT. In operation, the sending device is configured to consult with the server to determine which device or devices that the sending device is supposed to transport data thereto.

The compatibility between NAT types is such that some NAT types are much more restrictive than others. For example, with the above described four standard protocols, the compatibility chart shown in FIG. 3 arises. The chart of FIG. 3 essentially defines behind which types of NAT two devices may communicate with each other. In other words, Full-cone NATs permit communication with any NAT type (including other Full-cones). Restricted-cone NATs also permit communication with any NAT type, Port-restricted NATs can communicate with Full-cone, Restricted-cone & Port-restricted but not Symmetric. Symmetric NATs can communicate only with Full-cone and Restricted-cone.

Operationally, it appears that the devices behind Full-cone/Restricted-cone NATs are more "valuable" than others because they can be used to stream or transport data to any peer making a request. On the other hand, devices behind Port-restricted NATs are less "valuable" because they cannot stream or transport data to devices behind Symmetric peers. Devices behind Symmetric NATs are even less valuable because they cannot stream or transport data to peers behind either a Symmetric or a Port-restricted NAT.

Accordingly, when there is a request for peers to receive or supply data, it is preferable to avoid using up those devices behind the Full-cone/Restricted-cone NAT. In one embodiment, the server looks up in the database to determine candidates based on the following criteria:

Determine if there is a device behind a Symmetric NAT, if there is a one, chose that first;
If it is not possible to select a one behind such a Symmetric NAT first, the next candidates would be those behind a Port-restricted NAT.
Otherwise, devices behind a Full-cone or restricted-cone peer will be selected.

In operation, to avoid overusing or repeatedly designating those behind the Symmetric and port-restricted NATs, the sever is also loaded with a balancing module that facilitates to balance the allocation by making sure that same device is not designated to be a streaming or supplying device too much more often than it should be on average.

Figure 4:
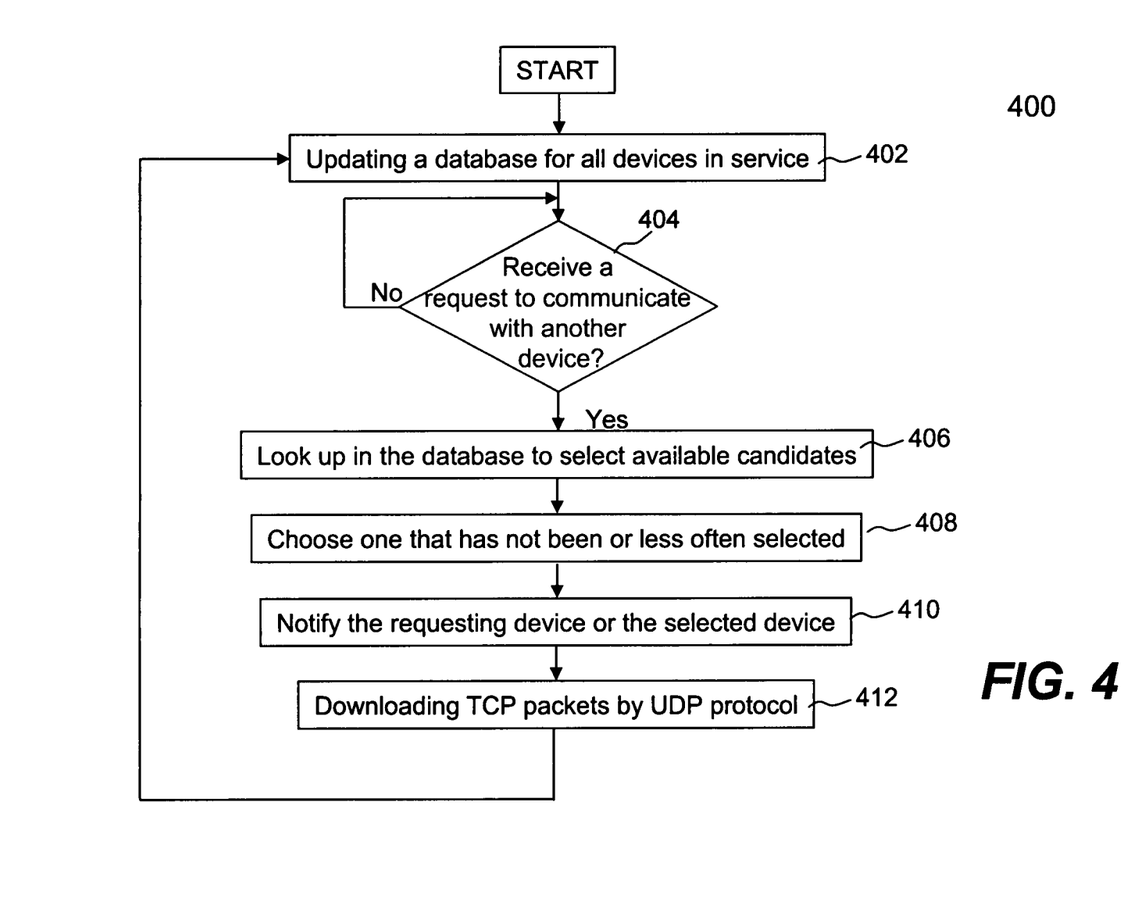
FIG. 4 shows, according to one embodiment of the present invention, a flowchart or process of establishing communication between two nodes, each being behind a network address translator.

Referring now to FIG. 4, there shows, according to one embodiment of the present invention, a flowchart or process 400 of managing communication between two devices, each being behind a NAT. To facilitate the understanding of the present invention, the process 400 is presented for peer-to-peer communication between device A and B as shown in FIG. 1. Accordingly, FIG. 4 may be understood in conjunction with FIG. 1. It can be appreciated that the description herein for FIG. 4 may be equally applicable to peer-to-peer communication between any two computing devices.

At 402, a computing device, referred herein as a server, updates a database that keeps various parameters, characteristics, surrounding conditions and status of each of the devices registered with the server. There may be many ways to keep the database updated. For example, a device, newly installed or recently put back online, can initiate a discovery process by sending a probing message to a server. Alternatively, the server may send to a device a message requesting certain parameters regarding the device to be updated.

According to one embodiment, a STUN protocol (allowing applications to discover the presence and a type of NAT) is used.

The server awaits a request from any one of the devices in service at 404. If no request is received or a predefined time period is out, the process 400 goes back to 402 to keep the database updated. It is now assumed that the request form one of the devices is received. According to one embodiment, the request is received from a device that has just been placed an order for a program (e.g., a large collection of data, a movie, an event broadcast). Because the device has none or only some of the data pertaining to the program, the device needs other selected devices to supply all of the data or the remaining part of the data. Accordingly, the ordering device initiates the request to the server.

Upon receiving the request, assuming the device has been authenticated and the user thereof has been authorized, the server is configured to look up at 406 in the database to select a set of available candidates. Among the criteria that a candidate device must satisfy is the requirement that the candidate must have some or all of the needed data, and the requirement that any NAT that the candidate device is behind is compatible with the NAT associated with the ordering device. At 408, among the selected candidates, a balancing measurement takes place to make sure that a finalist should not be the one that has been selected more often than others and in good condition to supply the needed data to the ordering device.

At 410, it is assumed that the server has designated a (supplying) device to supply the needed data, a message or an acknowledgement to the request is sent to the supplying device or the ordering device. Depending on implementation, the ordering device may initiate a request to the supplying device in accordance with the message from the server or the supplying device starts to upload the needed data to the ordering device.

In one embodiment, at 412, a special netfilter is used to convert the data conforming to one protocol in the supplying device to a data format conforming to another protocol to facilitate the data transmission through the respective NATs. The process 400 then goes to 402 to keep updating the database.

It should be noted that the process 400 is applicable to cases where the ordering device requires more than one supplying devices to supply the needed data. Further it can be appreciated by those skilled in the art that the process 400 is applicable to synchronize more than one supplying devices to supply the needed data to the ordering device at similar time.

Figure 5A:
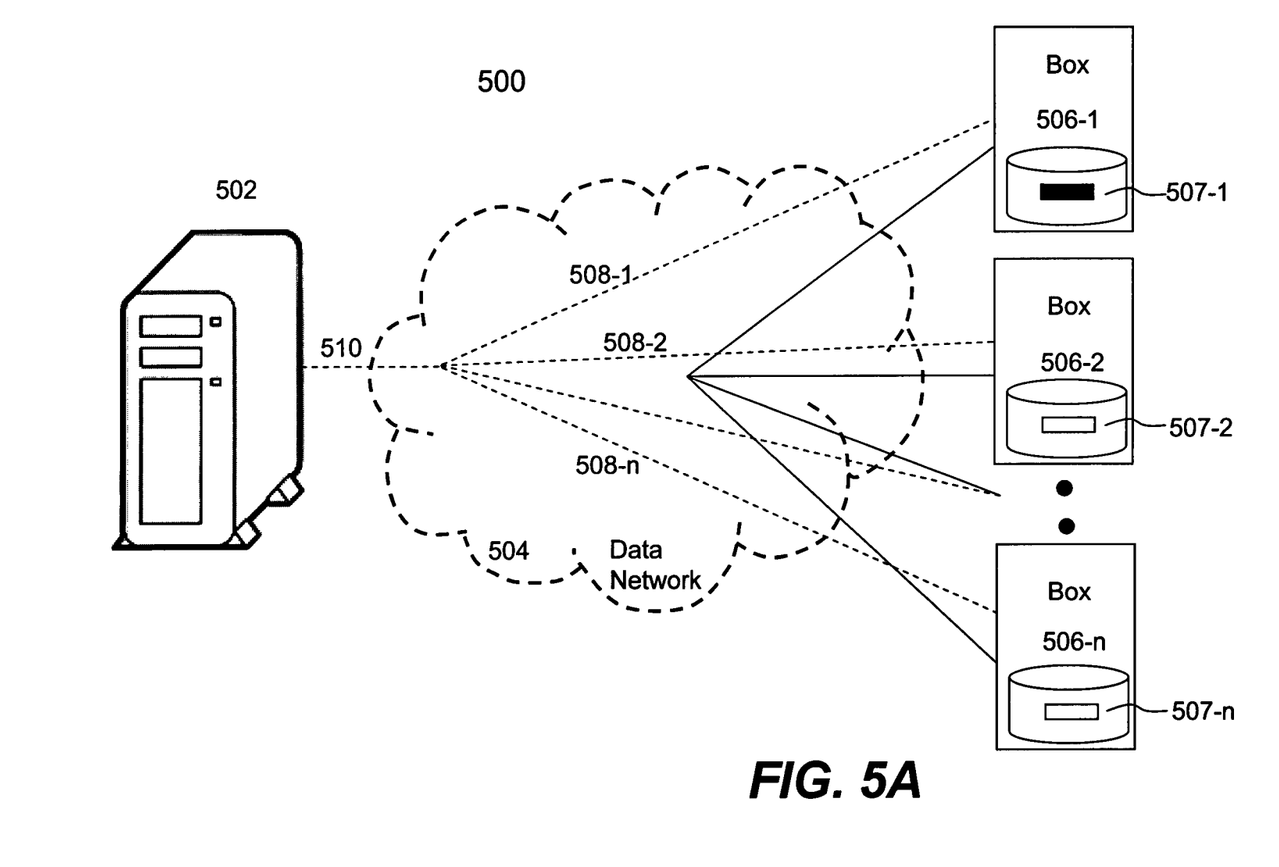
FIG. 5A shows an exemplary configuration of a distributed network system in which the present may be practiced.

To further understand the present invention, FIG. 5A shows an exemplary configuration of a distributed network system 500 in which the present invention may be practiced. A server 502, presumably managed and/or populated by a service provider, is configured to handle the delivery of video (or multimedia) services to users via local machines or boxes 506-1, 506-2, ... 506-n. Different from the prior art system that delivers video data to a subscriber upon receiving a request therefrom, the server 502 is not responsible for delivering the content in response to a request from a user, and instead is configured to provide source information as to where and how to retrieve at least some of the content from other boxes. In other words, the prior art system requires at least a media storage device to provide the content when any of the client machines is being serviced, while the server 502 does not need necessarily a media storage device to provide the content. Instead, some of the boxes 506-1, 506-2, ... 506-n are respectively configured to supply part or all of the content to each other.

According to one embodiment, when fulfilling a request from a local machine or a box 506-1 (e.g., corresponding to node A of FIG. 2), communication between the server 502 (e.g., corresponding to the server 208 of FIG. 2) and the box 506-1 over the network paths 508-1 and 510 may be limited to small-scale requests and responses (e.g., of small size and very short). A server response to a request from a box may include source information (e.g., identifiers), authorization information and security information. Using the response from the server 502, the box 506-1 may be activated to begin playback of a title. Data representing the title may be distributed in other boxes. The data, as will be shown below, is segmented into a number of segments, each is distributed to some boxes in services. Substantially at the same time, the box 506-1 may initiate one or more requests to other boxes (e.g., 506-2 and 506-n, corresponding respectively to nodes B and C) in accordance with the source identifiers to request the distributed segments (e.g., 507-2 and 507-n). Assuming proper authorization, the requesting box 506-1 receives the distributed segments concurrently from the other boxes according to the process 500 of FIG. 5

The contents available in a library being offered in any of the boxes 506-1, 506-2, ... 506-n are originally provided by one or more content providers. Examples of the content providers include satellite receivers, television relay stations, analog or digital broadcasting station, movie studios and Internet sites. Depending on implementation, the contents may be initially received or originated in the server 502. Instead of maintaining and managing the content in a large storage device, the server 502 is configured to distribute the content or files to a plurality of local machines registered with the server 502. The boxes 506-1, 506-2, ... 506-n shown in FIG. 5A are examples of local machines in service. Unless there is a need for a backup copy, the server 502 at any time has no need to keep a copy of the content. On the other hand, unless there is a special need to keep a complete copy of an extremely high-demand title in a box, none of the boxes in service has a complete copy of a title until an order is placed. Consequently, with embedded security in the distributed objects, one feature in the present invention may alleviate the concern of electronic piracy and widespread distribution (e.g., by hacking or illegal duplication).

For convenience, it is assumed herein that data or a file pertaining to a title is played back when the title is selected and ordered by a user. When an order for a title is placed, a corresponding file must be available for playback. One of the features in the present invention is that a file, or at least a portion thereof, regardless of its size, can be accessed instantaneously, thereby realizing instantaneous VOD. According to one embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering instantaneous VOD economically impractical.

According to one aspect of the present invention, only a beginning portion (referred to as a "header") and possibly one or more tail segments of a file are locally cached in a box. Such locally cached segments are referred to as residing objects or segments, while segments not residing locally are referred to as distributed objects or segments. When a title is selected, the header of the corresponding file is instantly played back. During the time the header is being played, the distributed segments corresponding to the title are retrieved simultaneously from other boxes. When the header is finished, the received parts of the distributed segments being streamed in from other boxes is combined with residing segments for the title, if any, to enable a continuous playback. Depending on the popularity and concurrent demand for a particular title, the number of residing objects may be increased or decreased to control the dependency of each box on other boxes for playback. Typically, the more residing objects for a title a box has, the more distributed copies of the title there are in the entire system and thus the less dependency of the ordering box on the other boxes.

In one embodiment, the header is always played first to ensure instant playback. In another embodiment, the header size is reduced to zero, in which case, a time-fill program is played first to provide a time frame that is sufficient enough to fetch and assembly the beginning data portion of the segments either locally available or from other boxes. Depending on implementation, the time-fill program may include one or more trailers related to the title being ordered, various notifications/updates or commercial programs. The time-fill program may be locally configured. In one embodiment, the time-fill program is provided to give a time frame in which data being fetched from one or more other devices can be stabilized. In another embodiment, the time-fill program provides a platform for sponsors that hope to display their respective programs to audience. Orders or slot positions for these programs in a time-fill program may be auctioned.

Figures 5B, 5C, 5D:
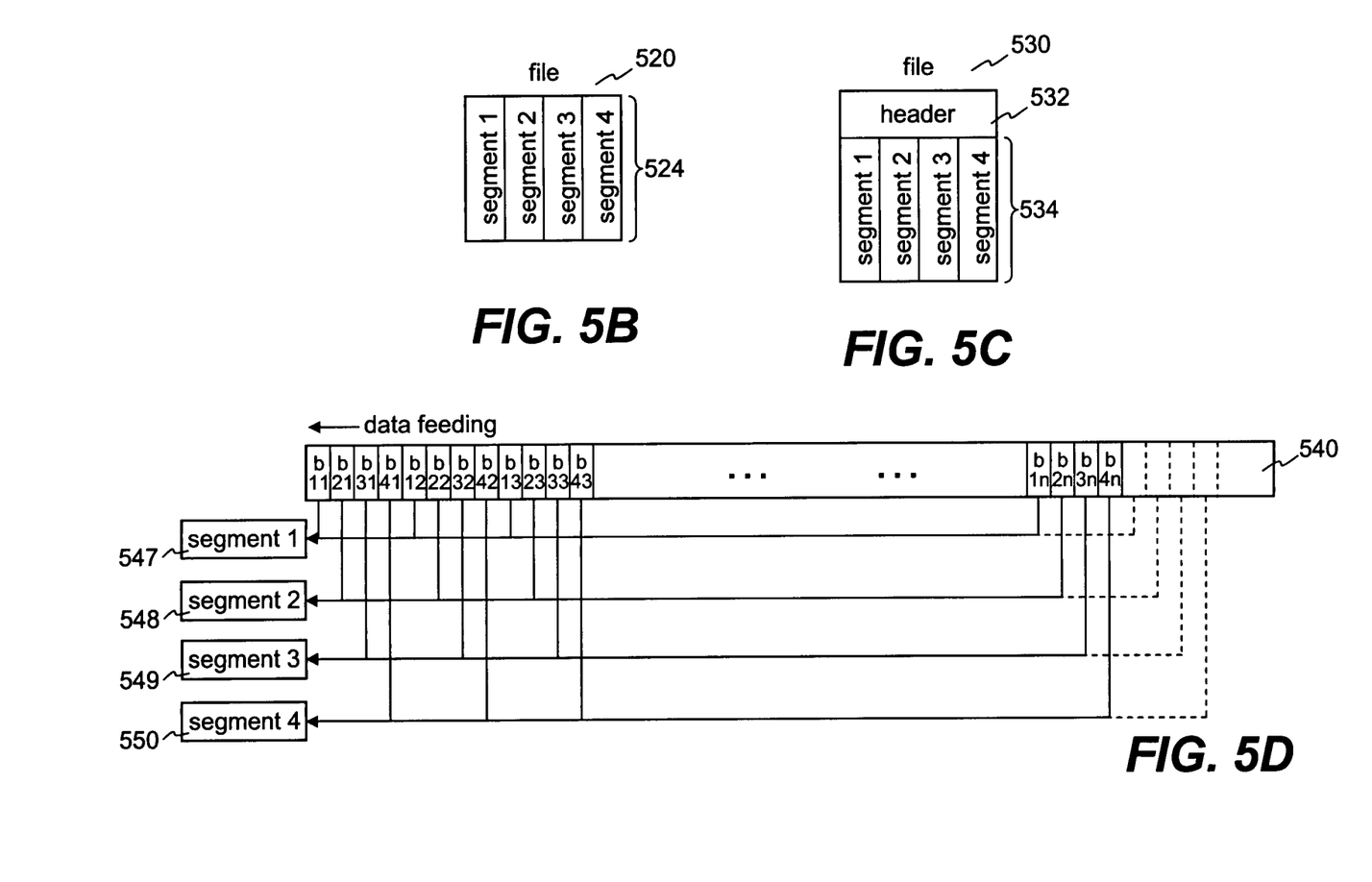
FIG. 5B shows, according to one embodiment, a file is being organized or fragmented in terms of four segments.
FIG. 5C shows another embodiment in which a file is being organized or fragmented in terms of a header and four segments, where the header is always locally cached.
FIG. 5D shows a data stream representing a file or a majority of a file, the file is being divided into four segments.

Referring to FIG. 5B, there shows an embodiment in which a file 520 is being organized or fragmented in terms of four segments 524. In general, the file 520 representing a collection of all data pertaining to a title may be divided into any number of segments in consideration of a required transmission rate (e.g., related to the encoding and decoding rates for successful playback), and the minimum uploading and downloading capabilities of a network. FIG. 2C shows another embodiment in which a file 530 is being organized or fragmented in terms of a header 532 and four segments 524, where the header 532 is always locally cached. One of the advantages of having a header locally cached is to facilitate an instantaneous playback after a movie is order. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Regardless whether a header is used or not, a file or a majority of a file will be fragmented and the segments are distributed among the boxes in service. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title.

It is assumed that a minimum uploading speed is U and a required transmission rate is D, and D/U=K<k, where k is the smallest integer greater than K. In one embodiment, a file or a majority of a file is preferably divided into k segments to optimally utilize the uploading speed of U, assuming that the downloading speed is at least k times faster than the uploading speed. For example, in a POTS-based DSL network for residential areas, the required transmission may be about 1.0 Mbps while the uploading speed may be about 300 kbps. Hence, k=4. Assuming that an ordering box has a downloading speed four times the uploading speed of the other boxes, up to four segments in other boxes can be downloaded concurrently across the network as streaming into the ordering box without interruption.

FIG. 5D shows a data stream 540 representing a file or a majority of a file. The file 540 is divided into four segments 547-550. The segments 547-550 are created or formed by respectively sampling the file in a decimated manner. As a result, each of the segments includes a plurality of data blocks. Depending on an exact data length of the file 540, an n-th data block in each of the segments 547-550 is four successive data blocks in the file. In one embodiment, a data block comprises a chunk of data, for example, 256 Kbytes or 1 Mbyte.

As shown in FIG. 5D, the data stream 540 is expressed in data blocks as follows: b11, b21, b31, b41, b12, b22, b32, b42, b13, b23, b33, b43, . . . b1n, b2n, b3n, b4n. With the decimated sampling, the four segments 547-550 obtained can be respectively expressed as follows:

Segment 1={b11, b12, b13, b14 . . . };

Segment 2={b21, b22, b23, b24 . . . };

Segment 3={b31, b32, b33, b34 . . . }; and

Segment 4={b41, b42, b43, b44 . . . }.

It should be noted, however, a header, if used, includes data blocks that must be consecutive so that an instantaneous playback of the header is possible. It is evident that the data blocks in the segments are non-consecutive or interlaced.

Figure 6A:
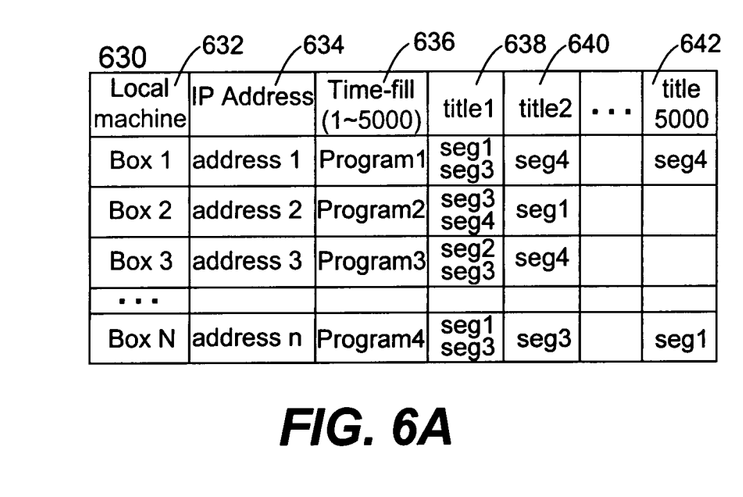
FIG. 6A shows an exemplary source information shown as a map illustrating how a library of 5000 movie titles is distributed across N boxes.

FIG. 6A shows exemplary source information shown as a map 630 illustrating how a library of 5000 movie titles is distributed across N boxes. Column 632 lists all boxes in service. Each box is assigned a unique identifier for identification. Information in the column 632 may be viewed as the identifiers for the boxes in service. For example, box 1 is assigned a unique identifier of "Box 1" or a sequence of alphanumeric characters. The column 634 lists a corresponding IP address for each of the boxes listed in column 632. The Column 636 lists predetermined time-fill programs for all titles in the library. Depending on implementation, the time-fill programs may be identical or each of the time-fill programs is self-configured in accordance with what has been ordered. The column 638 lists what segments for title1 are residing in each of the boxes, assuming title1 is required to have two segments cached in each box. The column 640 lists what segment for title2 is residing in each of the boxes, assuming title2 is required to have one segment cached in each of the boxes. The column 642 lists what segment for title5000 is in a selected set of boxes, assuming title5000 is required to have one segment in these selected boxes. As a result, all segments in a box may be uniquely addressed for uploading to another box or playback of an ordered title locally.

Figure 6B:
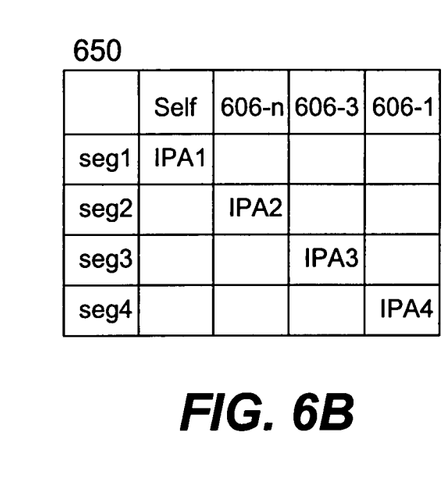
FIG. 6B shows a source information map corresponding to FIG. 3B, where three other boxes are designated to supply the needed three segments that are together assembled with the locally cached segment to facilitate the playback of the ordered movie.

FIG. 6B shows an exemplary source information map 650 corresponding to FIG. 6A. There are three other boxes 606-n, 606-3 and 606-1 designated to supply three needed segments that are together assembled with a locally cached segment to facilitate the playback of the ordered movie. Each of the entries (e.g., IPA1) in the source information map 650 may include the port and address information that facilitates the peer-to-peer or box-to-box communication between two devices. It can be appreciated that relying on multiple sources to retrieve distributed segments to support a playback can be advantageously used in the architecture of current networks where the downloading bandwidth is typically a multiple of the uploading bandwidth.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A method, to be performed by a processor, for facilitating peer-to-peer communications between a plurality of devices coupled to a network, the method comprising:
    receiving a request for a data item from a first device, of the plurality of devices, wherein a first network address translator is associated with the first device;
    identifying a set of devices, in the plurality of devices, each having at least a portion of the requested data item, wherein one or more network address translators are associated with the set of devices;
    prioritizing the set of devices based on a compatibility of the first network address translator with each of the one or more network address translators, wherein devices associated with more compatible network address translators are given a higher priority than devices associated with less compatible network address translators, wherein prioritizing the set of devices based on the compatibility of the first network address translator with each of the one or more network address translators comprises
        if (a) one or more network address translators (NATs) of the one or more NATs is a symmetric NAT and has an average previous designation frequency that does not exceed an allowable designation frequency, then designating as a second device a device of the set of devices associated with at least one of the one or more NATs satisfying (a);
        if a NAT of the one or more NATs is not found to satisfy (a), then if (b) one or more network address translators (NATs) of the one or more NATs is a Port-restricted NAT and has an average previous designation frequency that does not exceed the allowable designation frequency, then designating as a second device a device of the set of devices associated with at least one of the one or more NATs satisfying (b); and
        if a NAT of the one or more NATs is not found to satisfy (a) and (b), then designating as the second device a device of the set of devices associated with a NAT that is one of a Full-cone NAT and a restricted cone NAT and that has an average previous designation frequency that does not exceed the allowable designation frequency;
    designating a second device, of the set of devices, to supply data to the first device based, at least in part, on the prioritization; and
    enabling the first device to receive data pertaining to the requested data item from the second device.

2. The method as recited in claim 1 wherein designating a second device comprises designating the second device based on: (i) a compatibility of the first network address translator with a network address translator associated with the second device, and (ii) a number of times the second device has been designated to supply data to one or more of the plurality of devices.

3. The method as recited in claim 1, further comprising storing information pertaining to the plurality of devices in a database, the information identifying at least a network address translator associated with each of the plurality of devices.

4. The method as recited in claim 3, further comprising:
    receiving a probing message from a newly added device in the plurality of devices;
    determining a network address translator associated with the newly added device; and
    updating the database to include information pertaining to the newly added device.

5. The method as recited in claim 4, wherein the request includes an instruction to receive data pertaining to the data item from two or more devices.

6. The method as recited in claim 5, further comprising designating a third device, of the set of devices, to supply data to the second device, the third device being designated based on: (i) a compatibility of the first network address translator with a network address translator associated with the third device, and (ii) a number of times the third device has been designated to supply data to one or more of the plurality of devices.

7. The method as recited in claim 6, further comprising enabling the first device to initiate a data transfer with at least one of the second or third devices.

8. The method as recited in claim 6, wherein each of the second and third devices includes one or more locally stored segments pertaining to the requested data item, wherein the one or more locally stored segments in each of the second and third devices are non-consecutive.

9. The method as recited in claim 6, further comprising enabling at least one of the third and fourth devices to initiate a data transfer with the second device.

10. The method as recited in claim 8, wherein the second and third devices are configured to supply data from the respective segments, concurrently, to the first device.

11. The method as recited in claim 10, wherein enabling the first device to receive data pertaining to the requested data item from the second device comprises:
    enabling the first device to receive data from the second and third devices concurrently; and
    multiplexing the received data on the first device to recover the requested data item.

12. A method, to be performed by a processor, for initiating peer-to-peer communications between a first device and a plurality of devices coupled to a network, the method comprising:
    transmitting a request for a data item to a second device coupled to the network, wherein the second device is configured to: (i) identify a set of devices, in the plurality of devices, each having at least a portion of the requested data item, and (ii) prioritize the set of devices based on a compatibility of a first network address translator, associated with the first devices, with one or more network address translators, associated with the set of devices; and
    receiving data pertaining to the requested data item from a third device, of the set of devices, wherein the third device is designated to supply data to the first device based, at least in part, on the prioritization;
    wherein the second device is configured prioritize the set of devices based on the compatibility of the first network address translator with each of the one or more network address translators by
        if (a) one or more network address translators (NATs) of the one or more NATs is a symmetric NAT and has an average previous designation frequency that does not exceed an allowable designation frequency, then designating as a second device a device of the set of devices associated with at least one of the one or more NATs satisfying (a);

if a NAT of the one or more NATs is not found to satisfy (a), then if (b) one or more network address translators (NATs) of the one or more NATs is a Port-restricted NAT and has an average previous designation frequency that does not exceed the allowable designation frequency, then designating as a second device a device of the set of devices associated with at least one of the one or more NATs satisfying (b); and if a NAT of the one or more NATs is not found to satisfy (a) and (b), then designating as the second device a device of the set of devices associated with a NAT that is one of a Full-cone NAT and a restricted cone NAT and that has an average previous designation frequency that does not exceed the allowable designation frequency.

13. The method as recited in claim 12, wherein the third device is designated based on: (i) a compatibility of the first network address translator with a network address translator associated with the third device, and (ii) a number of times the third device has been designated to supply data to one or more of the plurality of devices.

14. The method as recited in claim 12, wherein the request includes an instruction to receive data pertaining to the data item from two or more devices.

15. The method as recited in claim 14, further comprising receiving data pertaining to the requested data item from a fourth device, of the set of devices, the fourth devices, the fourth device being designated, at least in part, on the prioritization.

16. The method as recited in claim 15, further comprising receiving a message from the second device, the method including information for enabling the first device to initiate a data transfer with at least one of the third or fourth devices.

17. The method as recited in claim 16, wherein each of the third and fourth devices includes one or more locally stored segments pertaining to the requested data item, wherein the one or more locally stored segments in each of the third and fourth devices are non-consecutive.

18. The method as recited in claim 17, wherein receiving data pertaining to the requested data item comprises receiving data from the respective segments of the third and fourth devices, concurrently.

19. The method as recited in claim 18, further comprising multiplexing the received data to recover the requested data item.

20. A system for managing peer-to-peer communications between a plurality of devices coupled to a network, the system comprising:
a first device, of the plurality of devices, to transmit a request for a data item, wherein a first network address translator is associated with the first device;
a second device, coupled to the network, to receive the request from the first device, the second device being configured to: (i) identify a set of devices, in the plurality of devices, each having at least a portion of the requested data item, and (ii) prioritize the set of devices based on a compatibility of the first network address translator with one or more network address translators associated with the set of devices such that a priority associated with a device of the set of devices decreases with a degree of compatibility of the network address translator thereof with other network address translators;
a third device, of the set of devices, designated to supply data to the first device, the third device being designated based, at least in part, on (i) the prioritization and (ii) a number of times the third device has been designated to supply data to one or more of the plurality of devices; and
wherein the second device enables the first device to receive data pertaining to the requested data item from the third device;
wherein the second device is configured prioritize the set of devices based on the compatibility of the first network address translator with each of the one or more network address translators by
if (a) one or more network address translators (NATs) of the one or more NATs is a symmetric NAT and has an average previous designation frequency that does not exceed an allowable designation frequency, then designating as a second device a device of the set of devices associated with at least one of the one or more NATs satisfying (a);
if a NAT of the one or more NATs is not found to satisfy (a), then if (b) one or more network address translators (NATs) of the one or more NATs is a Port-restricted NAT and has an average previous designation frequency that does not exceed the allowable designation frequency, then designating as a second device a device of the set of devices associated with at least one of the one or more NATs satisfying (b); and
if a NAT of the one or more NATs is not found to satisfy (a) and (b), then designating as the second device a device of the set of devices associated with a NAT that is one of a Full-cone NAT and a restricted cone NAT and that has an average previous designation frequency that does not exceed the allowable designation frequency.

21. The system recited in claim 20, further comprising a fourth device, of the set of devices designated to supply data to the first device, wherein each of the third and fourth devices includes one or more locally stored segments pertaining to the requested data item.

22. The system as recited in claim 21, wherein the one or more locally stored segments in each of the third and fourth devices are non-consecutive, and wherein the third and fourth devices are non-consecutive, and wherein the third and fourth devices are configured to supply data from the respective segments, concurrently, to the first device.

23. A non-transitory computer readable medium on which instructions are stored that, when executed by one or more processors, cause the one or more processors to perform steps comprising:
receiving a request for data item from a first device, of a plurality of devices coupled to a network, wherein a first network address translator is associated with the first device;
identifying a set of devices, in the plurality of devices, each having at least a portion of the requested data item, wherein one or more network address translators are associated with the set of devices;
prioritizing the set of devices based on a compatibility of the first network address translator with each of the one or more network address translators, wherein devices associated with more compatible network address translators are given a higher priority than devices associated with less compatible network address translators, wherein prioritizing the set of devices based on the compatibility of the first network address translator with each of the one or more network address translators comprises if (a) one or more network address translators (NATs) of the one or more NATs is a symmetric NAT and has an average previous designation frequency that does not exceed an allowable designation frequency, then designating as a second device a device of the set of devices associated with at least one of the one or more NATs satisfying (a);

if a NAT of the one or more NATs is not found to satisfy (a), then if (b) one or more network address translators (NATs) of the one or more NATs is a Port-restricted NAT and has an average previous designation frequency that does not exceed the allowable designation frequency, then designating as a second device a device of the set of devices associated with at least one of the one or more NATs satisfying (b); and if a NAT of the one or more NATs is not found to satisfy (a) and (b), then designating as the second device a device of the set of devices associated with a NAT that is one of a Full-cone NAT and a restricted cone NAT and that has an average previous designation frequency that does not exceed the allowable designation frequency;

enabling the first device to receive data pertaining to the requested data item from the second device.

* * * * *